(12) United States Patent
Newcombe et al.

(10) Patent No.: US 8,741,154 B2
(45) Date of Patent: Jun. 3, 2014

(54) WATER DENITRIFICATION

(76) Inventors: Remembrance Newcombe, Hayden, ID (US); Mark S. Lopp, Coeur d'Alene, ID (US)

(*) Notice: Subject to any disclaimer, the term of this patent is extended or adjusted under 35 U.S.C. 154(b) by 202 days.

(21) Appl. No.: 12/576,108

(22) Filed: Oct. 8, 2009

(65) Prior Publication Data

US 2010/0096339 A1    Apr. 22, 2010

Related U.S. Application Data

(60) Provisional application No. 61/106,520, filed on Oct. 17, 2008.

(51) Int. Cl.
*C02F 1/00* (2006.01)

(52) U.S. Cl.
USPC ........ 210/739; 210/198.1; 210/205; 210/209; 210/143

(58) Field of Classification Search
USPC .............. 210/610–611, 614, 739, 198.1, 205, 210/209, 143
See application file for complete search history.

(56) References Cited

U.S. PATENT DOCUMENTS

| | | | |
|---|---|---|---|
| 2,528,099 A | 10/1950 | Wilcox et al. |
| 2,696,462 A | 12/1954 | Bodkin |
| 2,730,239 A | 1/1956 | Peery |
| 2,863,829 A | 12/1958 | Henke et al. |
| 3,056,743 A | 10/1962 | Eichhorn et al. |
| 3,499,837 A | 3/1970 | Jaunarajs |
| 3,537,582 A | 11/1970 | Demeier |
| 3,619,425 A | 11/1971 | Blain et al. |
| 3,674,684 A | 7/1972 | Gollan |
| 3,679,581 A | 7/1972 | Kunz |
| 3,959,133 A | 5/1976 | Fulton |
| 4,003,832 A | 1/1977 | Henderson et al. |
| 4,049,545 A | 9/1977 | Horvath |
| 4,126,546 A | 11/1978 | Hjelmner et al. |
| 4,145,280 A | 3/1979 | Middelbeek et al. |
| 4,269,716 A | 5/1981 | Gurian |
| 4,366,128 A | 12/1982 | Weir et al. |
| 4,448,696 A | 5/1984 | White, Jr. |
| 4,689,154 A | 8/1987 | Zimberg |
| 4,732,879 A | 3/1988 | Kalinowki et al. |
| 4,842,744 A | 6/1989 | Schade |
| 5,087,374 A | 2/1992 | Ding |

(Continued)

FOREIGN PATENT DOCUMENTS

| | | |
|---|---|---|
| DE | 2724254 | 11/1978 |
| GB | 471277 | 9/1937 |

(Continued)

OTHER PUBLICATIONS

Kim, et al., "Microbial Fuel Cell-Type Biochemical Oxygen Demand Sensor," in Grimes, ed., Encyclopedia of Sensors, American Scientific Publishers (2006), vol. X at pp. 1-12, describes a BOD sensor.*

(Continued)

*Primary Examiner* — Chester Barry (57) ABSTRACT

The described implementations relate to water denitrification. One method obtains nitrate levels in influent and effluent of a moving bed media filter and determines carbon levels in the effluent. The method also doses carbon feedstock into the influent based on both the nitrate levels and the carbon levels.

7 Claims, 4 Drawing Sheets

(56) References Cited

U.S. PATENT DOCUMENTS

| | | |
|---|---|---|
| 5,102,556 A | 4/1992 | Wong |
| 5,173,194 A | 12/1992 | Hering, Jr. |
| 5,190,659 A | 3/1993 | Wang et al. |
| 5,236,595 A | 8/1993 | Wang et al. |
| 5,304,309 A | 4/1994 | SenGupta |
| 5,369,072 A | 11/1994 | Benjamin et al. |
| 5,443,729 A | 8/1995 | Sly et al. |
| 5,454,959 A | 10/1995 | Stevens |
| 5,468,350 A * | 11/1995 | Ban .................. 202/176 |
| 5,534,153 A | 7/1996 | Scott et al. |
| 5,670,046 A | 9/1997 | Kimmel |
| 5,674,402 A | 10/1997 | Nilsson et al. |
| 5,676,257 A | 10/1997 | Adkins |
| 5,679,257 A | 10/1997 | Coate et al. |
| 5,707,528 A | 1/1998 | Berry |
| 5,746,913 A | 5/1998 | Chang et al. |
| 5,755,977 A | 5/1998 | Gurol et al. |
| 5,843,308 A | 12/1998 | Suozzo et al. |
| 5,876,606 A | 3/1999 | Blowes et al. |
| 5,904,855 A | 5/1999 | Manz et al. |
| 5,911,882 A | 6/1999 | Benjamin et al. |
| 6,077,446 A | 6/2000 | Steiner et al. |
| 6,132,623 A | 10/2000 | Nikolaidis et al. |
| 6,143,186 A | 11/2000 | Van Unen |
| 6,163,932 A * | 12/2000 | Rosen .................. 210/605 |
| 6,200,482 B1 | 3/2001 | Winchester et al. |
| 6,217,765 B1 | 4/2001 | Yamasaki et al. |
| 6,319,412 B1 | 11/2001 | Reyna |
| 6,334,956 B1 | 1/2002 | Hanemaaijer |
| 6,387,264 B1 | 5/2002 | Baur |
| 6,426,005 B1 | 7/2002 | Larsson |
| 6,432,312 B1 | 8/2002 | Fuss |
| 6,464,877 B1 | 10/2002 | Mori et al. |
| 6,468,942 B1 | 10/2002 | Sansalone |
| 6,471,857 B1 | 10/2002 | Kaibara |
| 6,630,071 B1 | 10/2003 | Buisman et al. |
| 6,663,781 B1 | 12/2003 | Huling et al. |
| 6,716,344 B1 | 4/2004 | Bassi et al. |
| 6,942,786 B1 | 9/2005 | Fosseng |
| 6,942,807 B1 | 9/2005 | Meng et al. |
| 6,982,036 B2 | 1/2006 | Johnson |
| 7,029,589 B2 | 4/2006 | McGinness |
| 7,153,429 B1 * | 12/2006 | Pedros .................. 210/610 |
| 7,399,416 B2 | 7/2008 | Moller et al. |
| 7,445,721 B2 | 11/2008 | Moller |
| 7,713,423 B2 | 5/2010 | Moller et al. |
| 7,713,426 B2 | 5/2010 | Newcombe |
| 7,744,764 B2 | 6/2010 | Moller et al. |
| 2001/0052495 A1 | 12/2001 | Friot |
| 2002/0003116 A1 | 1/2002 | Golden |
| 2002/0077249 A1 | 6/2002 | Schlegel et al. |
| 2002/0088759 A1 | 7/2002 | Krulik et al. |
| 2004/0035770 A1 * | 2/2004 | Edwards et al. .............. 210/137 |
| 2004/0144728 A1 | 7/2004 | Moller et al. |
| 2004/0188348 A1 | 9/2004 | Yamasaki et al. |
| 2004/0222162 A1 | 11/2004 | Lee et al. |
| 2005/0127003 A1 | 6/2005 | Dennis |
| 2005/0173348 A1 | 8/2005 | Drake |
| 2005/0263447 A1 | 12/2005 | McGrew, Jr. |
| 2006/0000784 A1 | 1/2006 | Khudenko |
| 2006/0000785 A1 | 1/2006 | Moller |
| 2007/0136919 P1 | 6/2007 | Bak et al. |
| 2007/0163958 A1 | 7/2007 | Newcombe |
| 2007/0187329 A1 | 8/2007 | Moller et al. |
| 2007/0267346 A1 * | 11/2007 | Sengupta et al. .............. 210/610 |
| 2010/0032370 A1 * | 2/2010 | Allen et al. .................. 210/603 |

FOREIGN PATENT DOCUMENTS

| | | |
|---|---|---|
| GB | 1596205 | 8/1981 |
| JP | 03137990 | 6/1991 |
| JP | 7-232161 | 5/1995 |
| JP | 2001-070954 | 3/2001 |
| JP | 2002-159977 | 4/2002 |
| WO | WO 0110786 | 2/2001 |
| WO | WO 2004050561 | 6/2004 |

OTHER PUBLICATIONS

Beltran, "Heterogeneous Catalytic Ozonation," Ozone Reaction Kinetics for Water and Wastewater Systems, Chapter 10, Lewis Publishers, 2004 pp. 227-276.

Ravikumar, et al., "Chemical Oxidation of Chlorinated Organics by Hydrogen Peroxide in the Presence of Sand," Enviorn. Schi. Technol., 1994, 28, pp. 394-400.

* cited by examiner

WATER DENITRIFICATION

PRIORITY

This patent application claims priority from U.S. Provisional Application No. 61/106,520, filed on 2008 Oct. 17.

BACKGROUND

Water treatment facilities treat waste water to achieve one or more goals. For instance, a first goal may be to remove solids from the waste water. A primary treatment system may be devised to achieve this first goal. A second goal may be to break down organic components in the waste water. A secondary treatment system may be devised to receive effluent from the first system and to achieve the second goal. Accordingly, water treatment facilities tend to be developed serially with additional systems added downstream of one another to address the desired goals. Thus, overall facility cost and complexity grow quickly as additional water treatment goals are addressed. Further, added complexity inadvertently increases the chance of failure.

Nitrogen removal is one water treatment goal that has been increasingly addressed in recent decades. Consistent with the above discussion, nitrogen removal systems have increased facility cost and complexity with only marginal performance gains. The present concepts address cost, complexity, and/or performance for achieving desired water treatment goals.

SUMMARY

The described implementations relate to water denitrification. One method obtains nitrate levels in influent and effluent of a moving bed media filter and determines carbon levels in the effluent. The method also doses carbon feedstock into the influent based on both the nitrate levels and the carbon levels.

Another implementation is manifested as a system that can include a media filter. The media filter can be configured to facilitate conversion of nitrogen from a form that tends to remain in the water, such as nitrate/nitrite to a form that tends to outgas from the water, such as elemental or diatomic nitrogen. The system can also include a dosing mechanism configured to dose a carbon feedstock into influent of the media filter to promote the conversion. The system can further include a controller for controlling the dosing mechanism based upon levels of carbon and nitrate in effluent from the media filter.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present application. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the Figure and associated discussion where the reference number is first introduced.

DETAILED DESCRIPTION

Overview

This patent application pertains to water denitrification, and specifically to processes and/or techniques for effectuating and controlling denitrification. The denitrification can be promoted by dosing carbon feedstock for use by microorganisms involved in the denitrification process. The present implementations can efficiently control dosing by considering nitrate levels and carbon levels in effluent from the denitrification process. Considering both nitrate and carbon levels in the effluent can allow the present implementations to address instances of under-dosing and under-utilization of the dosed carbon feedstocks.

First Implementation

Figure 1:
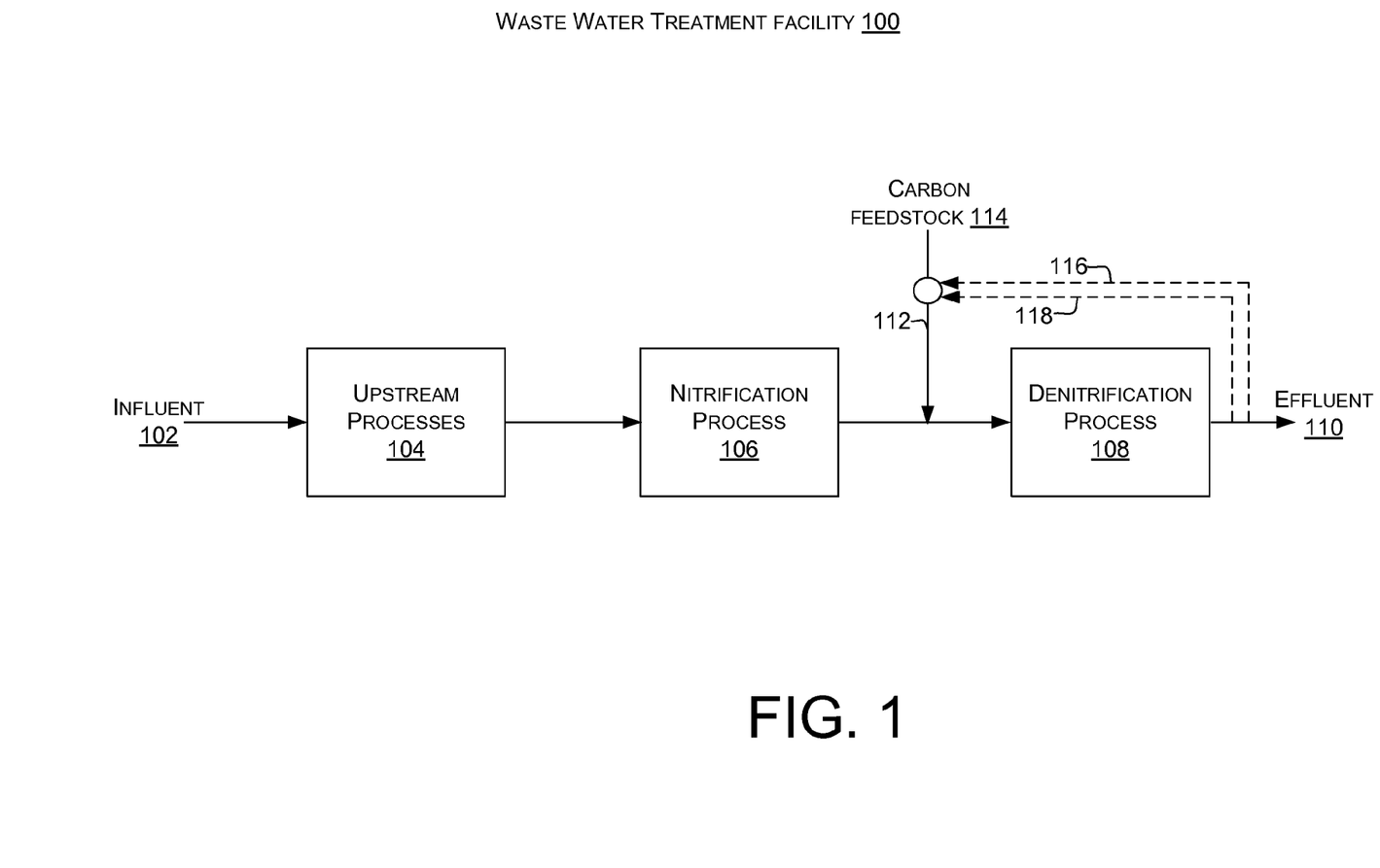
FIGS. 1-2 show exemplary water denitrification systems in accordance with some implementations of the present concepts.

FIG. 1 includes a water treatment facility 100 for denitrifying water received for treatment at 102. In this example, three basic water treatment processes are illustrated in association with water treatment facility 100. The water treatment processes are identified as "upstream" processes 104, nitrification processes 106, and denitrification processes 108. Upstream processes 104 can include various primary and/or secondary water treatment processes that are not addressed in further detail in this discussion. While called out here with specificity for discussion purposes, in some configurations nitrification processes 106 can be accomplished in the secondary water treatment processes.

Nitrification process 106 serves to drive nitrogen in the water from an ammonia/ammonium form toward a nitrite and finally a nitrate form. Nitrification process 106 is followed by denitrification process 108.

The denitrification process 108 serves to drive nitrogen from the nitrite/nitrate form (generically referred to hereinafter as "$NO_x$") to its elemental form (i.e., N) and/or its diatomic form ($N_2$). Elemental nitrogen (N) and/or diatomic nitrogen ($N_2$) tend to be less soluble than nitrite ($NO_2$) and nitrate ($NO_3$) forms. Further, $N/N_2$ tends to outgas into the surrounding air at a greater rate than $NO_2/NO_3$. This increased tendency to outgas as $N/N_2$ can reduce nitrogen concentrations in effluent 110 of denitrification process 108.

Denitrification process 108 can be achieved utilizing various microscopic organisms. These microorganisms can metabolize organic molecules (i.e., carbon containing molecules) to release energy. Oxygen tends to act as a final electron receptor during these metabolic processes. Lacking oxygen, or once the oxygen is used up, nitrogen can be employed as the final electron receptor. This process breaks the nitrate ions to produce elemental nitrogen.

Various techniques can be employed to promote the biological activity of these microorganisms and/or to increase the number of microscopic organisms associated with the denitrification process. One such technique is dosing 112 of additional carbon feedstocks (i.e., food) 114 that can be metabolized by the microorganisms. Non-limiting examples of carbon feedstocks can include methanol (MeOH) and ethanol (ETOH), among others. While this technique can be performant, there can be several potential pitfalls. First, adding carbon feedstocks tends to be expensive. Second, residual carbon feedstocks in the effluent 110 tend to be undesirable. For these two reasons, it can be beneficial to not dose significantly more carbon feedstocks 114 than can be utilized by the microorganisms to achieve the denitrification process 108. Third, these microorganisms, like any other living things, are affected by their environment. For instance, some environmental parameter(s), such as temperature, may affect the metabolic rate of the microorganisms. Similarly, some environmental parameter, such as a toxin that appears in the water, may kill some or all of the microorganisms. Fourth, the state of the microorganisms tends not to be readily, directly, detectable in a timely fashion.

Accordingly, the present implementations can utilize indirect information about the state of the microorganisms to control dosing of the carbon feedstocks to satisfy at least the first two factors described above. Further, many of these implementations can achieve this dosing control with relatively few additional costs, components, and/or complexity. In fact, many of these implementations improve carbon feedstock dosing 112 over existing solutions with a simpler and more reliable system configuration than existing techniques.

One particular implementation can obtain $NO_x$ levels 116 in effluent 110 from denitrification process 108. The process can also determine carbon levels 118 in the effluent 110. Dosing 112 of the carbon feedstocks 114 can be based upon the effluent $NO_x$ and carbon levels. Briefly, increasing effluent $NO_x$ levels accompanied by decreasing carbon levels can indicate that the microorganisms are underfed and thus dosing levels can be increased so that the microorganisms can convert more $NO_x$ to elemental nitrogen. However, in an instance where both the carbon levels and the $NO_x$ levels are high and/or rising, some condition may be occurring so that the microorganisms are not utilizing (or are under-utilizing) the carbon feedstocks 114. The present implementations can detect this condition and take appropriate action such as reducing carbon feedstock dosing rates, temporarily stopping carbon feedstock dosing and/or triggering an alarm condition so that further action can be taken.

In contrast, existing technologies simply sense effluent $NO_x$ levels with no regard to effluent carbon levels. With these existing technologies, if the $NO_x$ levels rise, then the techniques responsively dose more carbon feedstocks. If the microorganisms are unable to use the carbon feedstocks (or under-utilize the carbon feedstocks) then these techniques have both wasted expensive carbon feedstocks and undesirably increased carbon bleed-through in the effluent. In summary, these existing technologies do not contemplate a scenario where the microorganisms cannot utilize the dosed carbon feedstock. This is especially true where some environmental parameter quickly changes and causes a sudden decrease in the activity of the microorganisms.

Second Implementation

Figure 2:
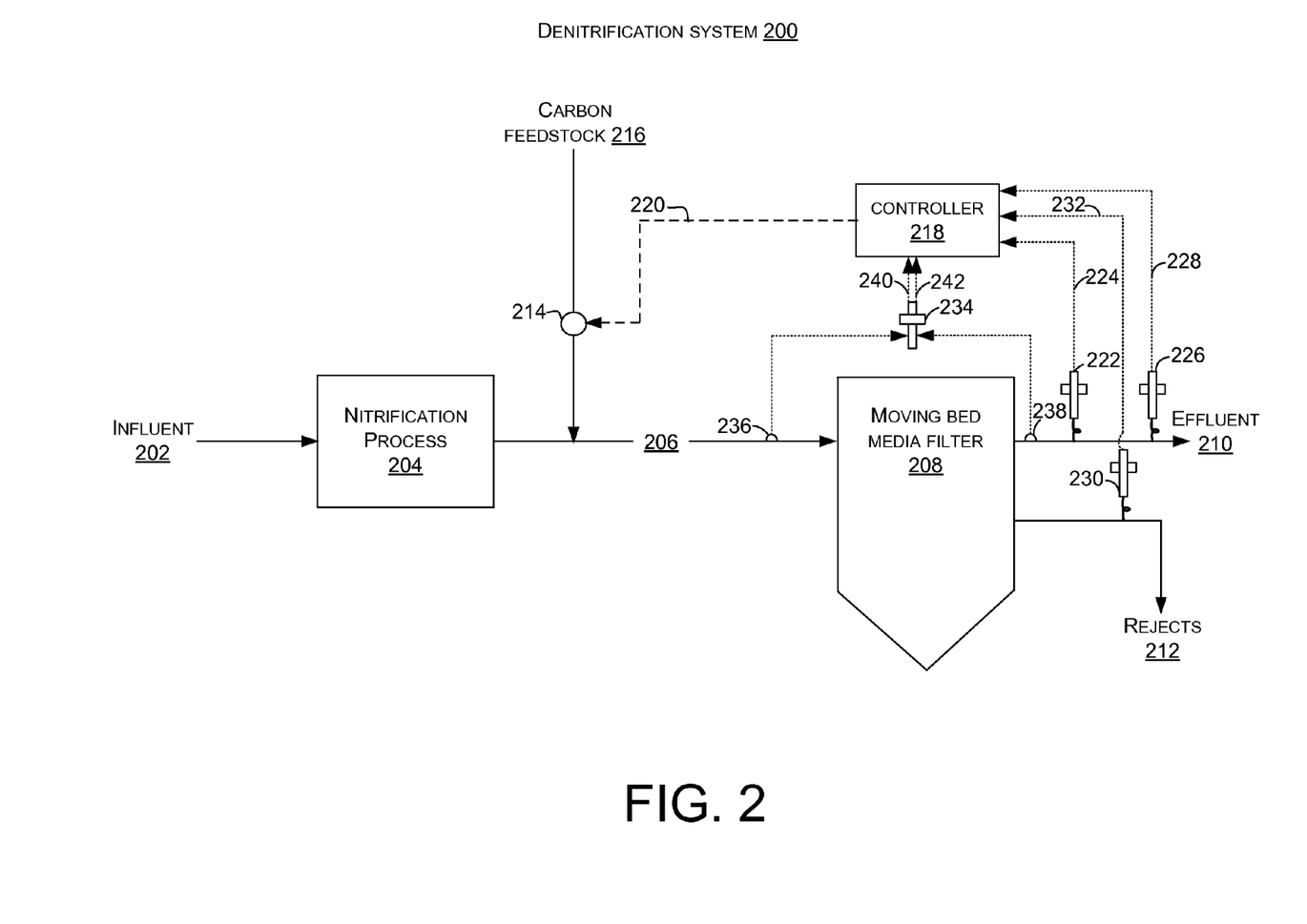

FIG. 2 illustrates an exemplary denitrification system 200 where influent water 202 is received by a nitrification process 204. Influent water 202 is often treated with other processes before receipt at the nitrification process 204. Water 206 that emerges from the nitrification process 204 serves as influent to a media bed, such as moving bed media filter 208. Accordingly, water 206 can be termed "moving bed media filter influent water 206" to avoid confusion with influent water 202.

Moving bed media filter 208 can be a continuous backwash filter that can be either an upflow, downflow, or other configuration. Briefly, in this case moving bed media filter 208 is a continuous backwash filter that utilizes a media, such as sand, to separate contaminants from water that passes through the media. The moving bed media filter can facilitate nitrogen conversion, such as by providing an environment that is conducive to growth of microorganisms.

A majority of the treated water emerges from moving bed media filter 208 as effluent 210. A minority of the treated water can be utilized to carry separated contaminants from the media in a waste stream or rejects 212. Cleaned media can be re-circulated for reuse. Examples of moving bed media filter 208 are commercially available, such as the Centra-flo brand available from Blue Water Technologies, Inc.

Denitrification system 200 also includes a dosing mechanism 214 for dosing carbon feedstocks 216 into moving bed media filter influent water 206. Doses delivered by dosing mechanism 214 can be controlled by a controller 218 as indicated by control signal 220. The controller 218 can base the control of the dosing mechanism 214 at least in part upon information obtained from moving bed media filter influent 206 and effluent 210, examples of which are described below.

In this case, the information can include carbon effluent levels obtained by a sensor 222 that sends a signal 224 to controller 218. Sensor 222 can sense chemical oxygen demand (COD), total organic carbon (TOC) or other suitable carbon level parameter(s). A flow sensor 226 can send a signal 228 to the controller regarding water flow rate of effluent 210. Similarly, a flow sensor 230 can send a rejects flow rate signal 232 to controller 218 regarding the flow rate of rejects 212. The flow rate of moving bed media filter influent water 206 can be inferred as essentially equaling the sum of the flow rate of effluent 210 and rejects 212. Since many existing facility configurations specify means for sensing the effluent rates and rejects rates, the present implementations can indirectly determine the flow rate of moving bed media filter influent water 206 rather than adding an additional sensor for this task. This is but one example of how the present implementations can be achieved with relatively low cost and little or no added complexity. However, while this implementation indirectly determines influent flow rates, other implementations can directly sense or measure influent flow rates, such as with a flow sensor or meter on the influent.

In this particular configuration a single nitrate sensor or probe 234 is connected to two sample streams 236 and 238 located in moving bed media filter influent water 206 and effluent 210, respectively. This configuration allows sensor 234 to send a first signal 240 relating to influent nitrate levels and/or a second signal 242 relating to effluent nitrate levels to controller 218. This is another example of how the present concepts can be implemented at relatively low cost. In other configurations, sensor 234 can be configured to sense alternative or additional nitrogen forms such as nitrite.

Controller 218 can utilize one or more of input signals 224, 228, 232, 240, and 242 to determine a dosing level that promotes conversion of nitrate into nitrogen (i.e., nitrogen gas and/or diatomic nitrogen) in moving bed media filter 208 without any (or excessive) carbon bleed-through into effluent 210.

Figure 3:
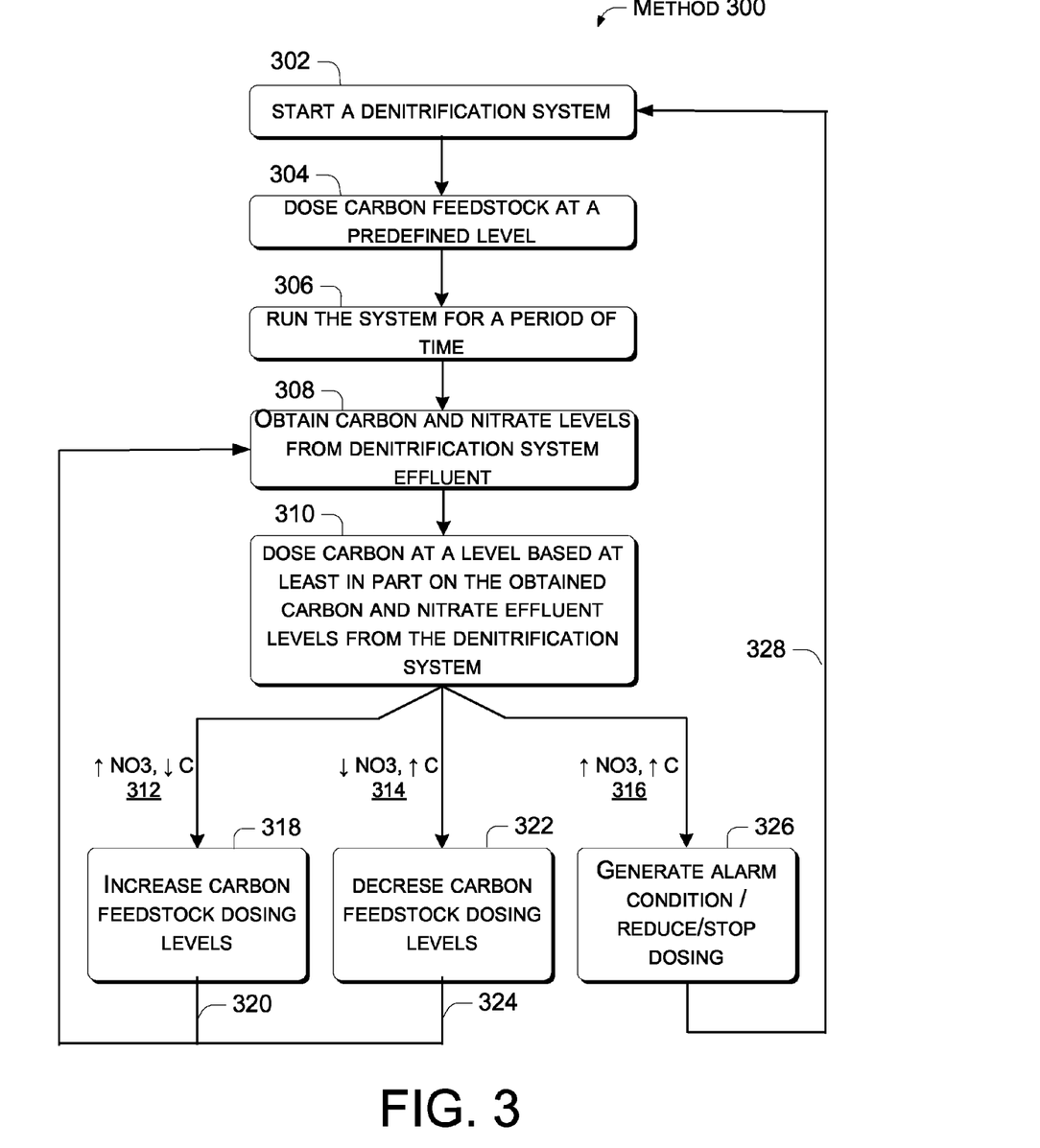
FIGS. 3-4 are flowcharts of exemplary water denitrification methods in accordance with some implementations of the present concepts.
Figure 4:
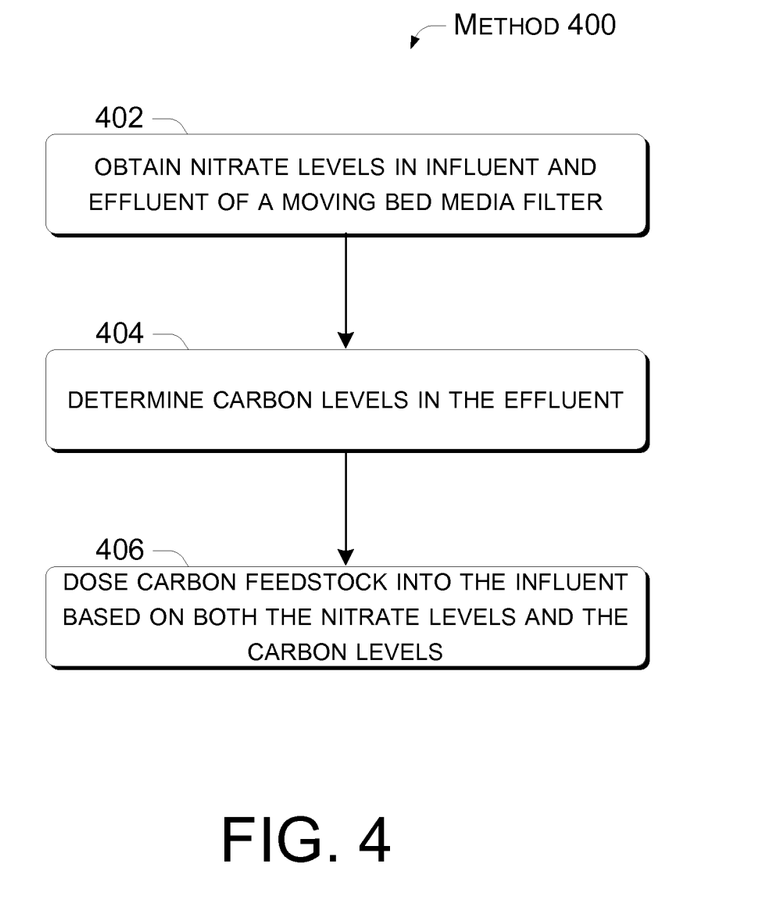

Controller 218 can be implemented in many forms. At one extreme, the controller can be implemented in a black box form, such as an application specific integrated circuit (ASIC) that may not be readily adjustable in the field. In another implementation, the controller can be implemented as an application on a computing device, such as a personal computer (PC). In such an implementation, the controller may generate a user-interface from which a technician can observe carbon feedstock dosing levels and/or adjust various algorithm parameters to accommodate specific facility effluent criteria. For instance, one facility may specify a lower allowed carbon bleed-through rate than another facility. In such a case, the algorithm can be adjusted to minimize carbon bleed-through by allowing slightly higher nitrate effluent levels. FIGS. 3 and 4 provide examples of algorithms that can be performed by controller 218 to determine the carbon feedstock dosing levels.

Exemplary Methods

FIG. 3 illustrates a flowchart of a method or algorithm 300 that is consistent with at least some implementations of the present concepts. The order in which the method 300 is described is not intended to be construed as a limitation, and any number of the described blocks can be combined in any order to implement the method, or an alternate method. Furthermore, the method can be implemented in any suitable hardware, software, firmware, or combination thereof such that a computing device can implement the method. In one case, the method is stored on a computer-readable storage media as a set of instructions such that execution by a computing device, such as the ASIC and PC introduced above in relation to FIG. 2, causes the computing device to perform the method.

Block 302 starts a denitrification system/process. This can occur at startup of a water treatment facility and/or after the denitrification system has been stopped for some reason.

Block 304 doses carbon feedstock at a predefined level. The predefined level may be established when the controller is manufactured or may be defined and/or adjusted in the field, such as by an operator. For instance, the operator may set or adjust the predefined level via the controller's user-interface described above in relation to FIG. 2. In one case, the carbon feedstock can be dosed based upon nitrate and/or nitrite levels in the influent flow of the denitrification process. One example of such influent is designated as moving bed media filter influent water 206 relative to FIG. 2.

Some implementations can utilize methanol (MeOH) as the carbon feedstock. In one example, the predefined level can equal a 3.3 MeOH to 1.0 $NO_3$ (as N) dosing ratio by weight for the influent. Another example may start at a lower predefined dosing level such as 2.5 MeOH to 1.0 $NO_3$ (as N) until a relatively steady state is achieved. Steady state can indicate that the microorganisms have adequately colonized the denitrification system and are generally in balance with their environment. Effluent $NO_3$ levels may be elevated during startup. However, once effluent $NO_3$ levels stabilize at the steady state, the MeOH dosing levels can be slowly raised to an optimum level with reduced risk of carbon overdosing and consequent carbon bleed-through in the effluent.

Block 306 runs the denitrification system for a period of time. For instance, the period of time may last until effluent carbon and/or $NO_3$ levels achieve the steady state. Of course, as mentioned above, steady state does not imply that effluent carbon and $NO_3$ levels remain at exact values since influent $NO_3$ levels may vary over time. Instead, the steady state indicates that the microorganisms have adequately colonized the denitrification system and are generally in balance with their environment.

Block 308 obtains carbon and $NO_3$ levels from denitrification system effluent. Rather than being viewed as a single occurrence, block 308 may be repeated multiple times, such as on a periodic basis, both during and after the period of time described at block 306.

Block 310 doses carbon feedstocks at a level based, at least in part, on the obtained carbon and $NO_3$ effluent levels from the denitrification system. This dosing can be based upon the goals of a particular waste water treatment facility. For instance, one goal may be to reduce effluent $NO_3$ levels as much as possible without overdosing carbon to the point of having carbon bleed-through. Previous technologies only sensed effluent $NO_3$ and thus could not adjust carbon dosing levels to achieve this goal. Alternatively or additionally, other goals that can be met with the current implementations may be to lower $NO_3$ to a specific concentration such as 3 mg/L $NO_3$ (as N), or to lower it by a certain concentration, such as by removing 10 mg/L $NO_3$ (as N).

For discussion purposes, the carbon feedstock dosing of block 310 may be based on one of three evolving scenarios. First, at 312, the obtained $NO_3$ levels may be high and the carbon levels low. Second, at 314, the obtained $NO_3$ levels may be low and the carbon levels high. Third, at 316, the obtained $NO_3$ levels may be high and the carbon levels high.

In an instance where the condition indicated at 312 is detected then the method can increase carbon feedstock dosing levels at 318 to foster the biological activities of microorganisms associated with the denitrification process. Increasing the carbon feedstock dosing levels can increase both the number (i.e., biomass) and/or biological activity of the microorganisms so that more $NO_3$ is converted to nitrogen.

Carbon feedstock dosing levels can be based on gross terms or tied to flow rates. For instance, one implementation can increase carbon feedstock dosing levels from 5 liters/minute to 6 liters/minute, for example. Another implementation can base the increase relative to the flow rate. For instance, hypothetically, this implementation can increase dosing levels from 0.5 milliliters carbon feedstock/liter of influent to 0.6 milliliters carbon feedstock/liter of influent, for example. In another example, dosing levels can be increased when effluent $NO_3$ levels rise above a first pre-established value of 3 mg/L $NO_3$ (as N). The process can then return to block 308 as indicated at 320.

In an instance where the condition indicated at 314 is detected (i.e., low effluent $NO_3$ levels and high effluent carbon levels) then the method can decrease carbon feedstock dosing levels at 322 to reduce carbon bleed-through. In one quantitative example, dosing levels can be decreased when effluent carbon levels rise above a second pre-established value of 20 mg/L COD. The process can then return to block 308 as indicated at 324.

In an instance where the condition indicated at 316 is detected (i.e., high effluent $NO_3$ levels and high effluent carbon levels) then the method can generate an alarm condition and/or reduce/stop carbon feedstock dosing at 326. Various actions can be taken responsive to generating the alarm condition. For example, a message indicating the alarm condition can be sent to a technician or system operator.

The detected alarm condition can occur when one or more environmental parameters affect the microorganisms in the denitrification process. For instance, a toxin could have passed through the denitrification system and killed many of the microorganisms. Thus, the dosed carbon feedstock is not being utilized (or is under-utilized). Further, manual and/or automated steps can be taken in response to the alarm condition. For instance, the technician may sample and analyze water quality parameters to check the readings and/or troubleshoot the system for mechanical or other system failures.

As indicated at 328, the method may cause the denitrification process/system to automatically restart by returning to block 302 in an attempt to allow a steady state to be re-established. Examples of other conditions that can be utilized to trigger the alarm condition can include when both the nitrate levels and the carbon levels rise for a predefined period of time. Another example can be when both the nitrate levels and the carbon levels rise by a predefined amount or percentage, or rise above a predetermined point for a predefined period of time.

An alternative algorithm can be based upon a difference or delta of the influent and effluent COD. Such an implementation can consider influent carbon loading (i.e., influent COD into the denitrification process) for determining carbon feedstock dosing rates. For instance, if increasing delta COD values are caused by increasing influent COD levels, then dosing levels can be maintained. This implementation can provide an alarm if the effluent COD exceeded some preset input value based on the discharge permit.

In one example, if a facility has a normal effluent of 20-40 mg/L COD then this method can subtract influent COD from the effluent COD. If the delta values exceed, for example 2 mg/L, then the method can decrease carbon feedstock dosing. If the delta value exceeds 4 mg/L, for example, and is trending higher, then the method can stop carbon feedstock dosing.

Still another exemplary algorithm is characterized below for determining carbon feedstock dosing levels:

Increase MeOH feed if effluent $NO_3$ is higher than the effluent set point and COD bleed is below setpoint of 2 mg/L.

Decrease or stop MeOH feed if effluent $NO_3$ is lower or equal to the effluent set point and COD bleed is below setpoint of 2 mg/L.

Decrease MeOH feed if effluent COD exceeded a delta of 5 mg/L.

Stop MeOH feed if the maximum setpoint for plant discharge is exceeded, i.e. above 40 mg/L.

This method can be implemented with one COD analyzer with a split feed for influent and effluent and can cycle back and forth to reduce costs.

Some implementations may continuously readjust the carbon feedstock dosing levels each time effluent carbon and $NO_3$ levels are obtained at block 308. For instance, assume that block 308 is performed periodically, such as every minute. Then, the carbon dosing levels of block 310 can be adjusted every minute. Other implementations can allow for buffering and/or averaging of the obtained effluent carbon and $NO_3$ levels when calculating carbon dosing levels at 310. For example, the method can average the obtained values over an extended period of time and then dose carbon levels at 310 based upon the averaged values. For instance, such a method could average the values obtained at block 308 for an hour and then adjust the dose once per hour at block 310 based upon the average. Such a configuration may produce more consistent results and reduce oscillating above and below desired effluent levels.

Some implementations can also allow for the manual overriding and/or adjusting of the algorithm when desired. For example, the algorithm could vary depending on temporal or varying conditions—some sites have different nitrate effluent goals in summer vs. winter, etc. For example, such manual adjustments can be accomplished via the controller's user-interface described above in relation to FIG. 2.

FIG. 4 illustrates a flowchart of a method or algorithm 400 that is consistent with at least some implementations of the present concepts. The order in which the method 400 is described is not intended to be construed as a limitation, and any number of the described blocks can be combined in any order to implement the method, or an alternate method. Furthermore, the method can be implemented in any suitable hardware, software, firmware, or combination thereof such that a computing device can implement the method. In one case, the method is stored on a computer-readable storage media as a set of instructions such that execution by a computing device, such as the ASIC and PC introduced above in relation to FIG. 2, causes the computing device to perform the method.

Block 402 obtains nitrate ($NO_3$) levels in influent and effluent of a moving bed media filter. Some implementations may also obtain nitrite ($NO_2$) levels. Nitrite levels can be utilized alone or in combination with nitrate levels (referred to generally as $NO_x$).

Block 404 determines carbon levels in the effluent. Various analytical techniques can be utilized to determine the carbon levels. Carbon levels are often expressed as total organic carbon (TOC) and/or chemical oxygen demand (COD), among others.

Block 406 doses carbon feedstock into the influent based on both the nitrate levels and the carbon levels. Some implementations can base the dosing purely from the nitrate and carbon levels of blocks 402, 404. Other implementations can include other parameters to calculate the dosing levels. Other parameters can include, flow rate (either influent or effluent), alkalinity, dissolved oxygen (DO), water temperature, and/or pH.

In summary, the above described systems and methods allow more precise carbon feedstock dosing control than existing denitrification techniques. Accordingly, desired denitrification of effluent water can be achieved while reducing any instances of carbon feedstocks remaining in the effluent.

CONCLUSION

Although techniques, methods, devices, systems, etc., pertaining to wastewater denitrification scenarios are described in language specific to structural features and/or methodological acts, it is to be understood that the subject matter defined in the appended claims are not intended to be limited to the specific features or acts described. Rather, the specific features and acts are disclosed as exemplary forms of implementing the claimed methods, devices, systems, etc.

The invention claimed is:

1. A system, comprising:
    a media filter configured to facilitate conversion of nitrogen from a first form that is less likely to outgas from water to a second form that is more likely to outgas from the water;
    a dosing mechanism configured to dose a carbon feedstock into influent water of the media filter to promote the conversion;
    a first sensor configured to detect a level of carbon in effluent water from the media filter;
    a second sensor configured to detect a level of nitrate in effluent water from the media filter; and
    a controller configured to control the dosing mechanism in response to the sensed levels of carbon and nitrate in effluent water from the media filter, wherein the controller is further configured to reduce a carbon feedstock dosing rate in response to increasing levels of carbon and nitrogen.

2. The system of claim 1, wherein the first form is one or more of: nitrate or nitrite and the second form is one or more of: elemental nitrogen or diatomic nitrogen.

3. The system of claim 1, wherein the media filter comprises a moving bed media filter with a relatively anoxic environment for accomplishing the conversion.

4. The system of claim 3, wherein the moving bed media filter has a generally aerobic environment at start-up and achieves the relatively anoxic environment at a subsequent point.

5. The system of claim 1, wherein the controller is further configured to control the dosing mechanism based upon an influent flow rate to the media filter and a nitrate level in the influent water.

6. The system of claim 1, wherein the controller is further configured to increase the carbon feedstock dosing rate when effluent nitrate levels rise and effluent carbon levels fall.

7. The system of claim 1, wherein the controller is configured to generate an alarm condition when both the nitrate levels and the carbon levels rise for a predefined period of time, rise by a predefined amount or percentage, or rise above a predetermined point for a predefined period of time.

* * * * *